E. M. LITTLE.
APPARATUS FOR MANUFACTURING VEHICLE BUMPER BARS.
APPLICATION FILED DEC. 22, 1919.

1,354,770.

Patented Oct. 5, 1920.
4 SHEETS—SHEET 1.

INVENTOR.
Edward M. Little
BY
ATTORNEYS.

E. M. LITTLE.
APPARATUS FOR MANUFACTURING VEHICLE BUMPER BARS.
APPLICATION FILED DEC. 22, 1919.

1,354,770. Patented Oct. 5, 1920.

INVENTOR.
Edward M. Little
BY
Acker & Totten
ATTORNEYS.

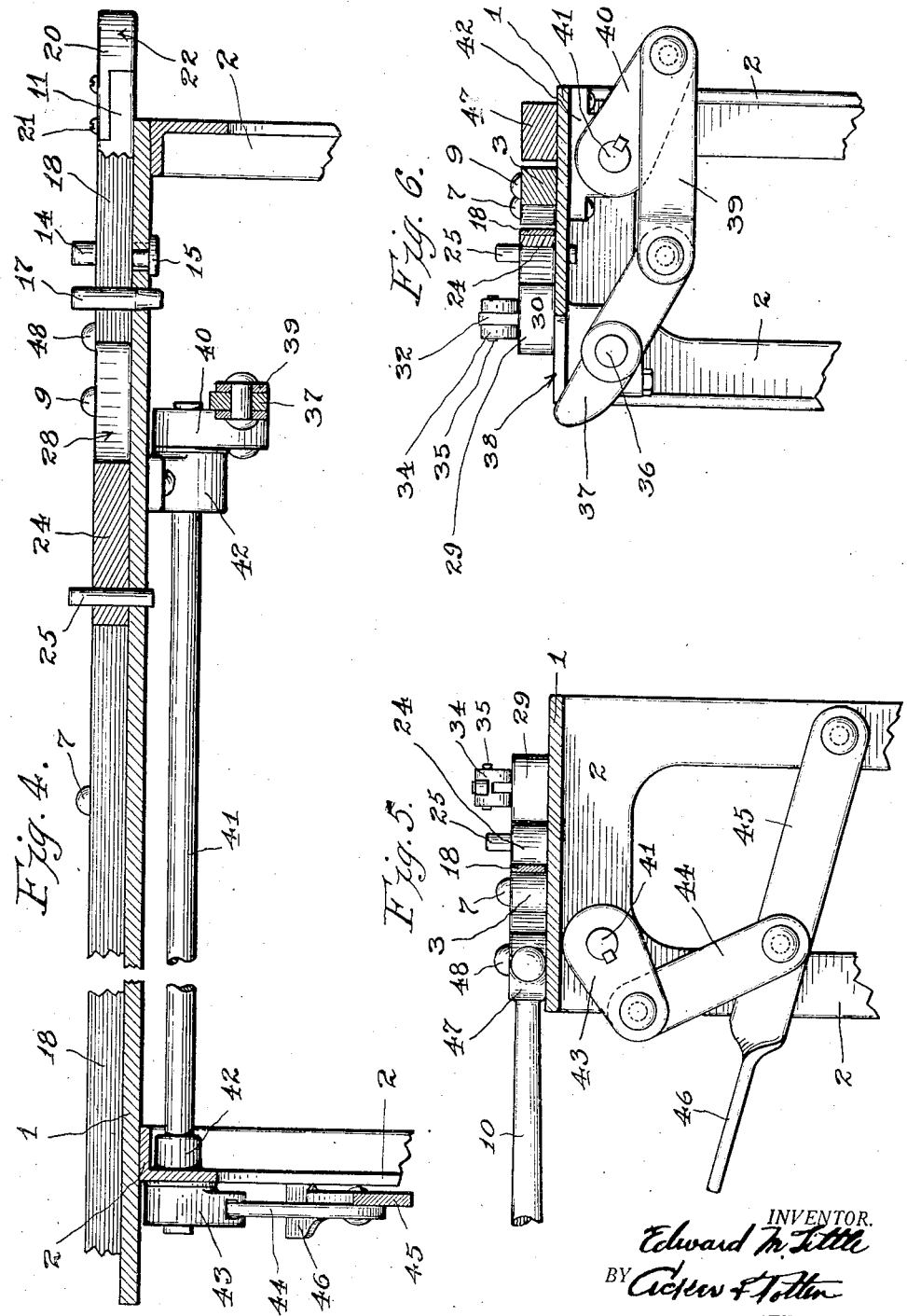

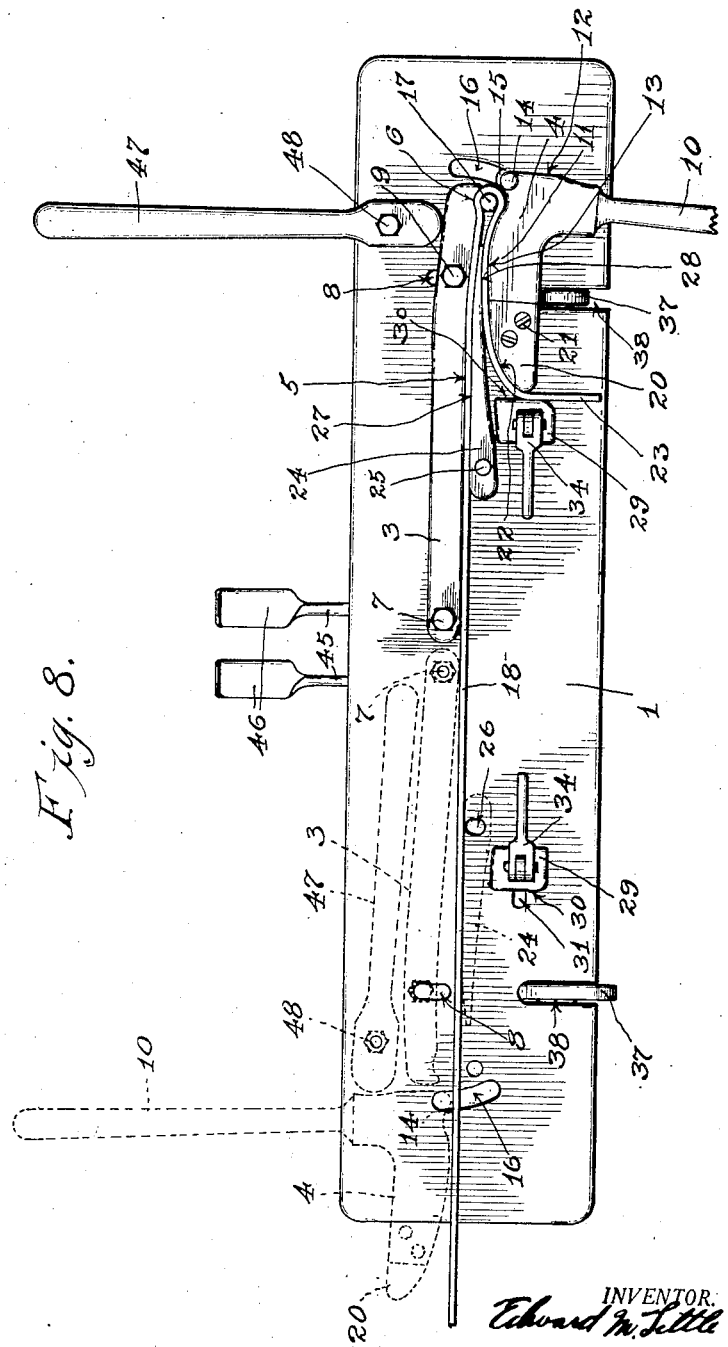

UNITED STATES PATENT OFFICE.

EDWARD M. LITTLE, OF SAN FRANCISCO, CALIFORNIA, ASSIGNOR TO HOOVER SPRING COMPANY, OF SAN FRANCISCO, CALIFORNIA, A CORPORATION OF CALIFORNIA.

APPARATUS FOR MANUFACTURING VEHICLE BUMPER-BARS.

1,354,770.      Specification of Letters Patent.      Patented Oct. 5, 1920.

Application filed December 22, 1919. Serial No. 346,720.

*To all whom it may concern:*

Be it known that I, EDWARD M. LITTLE, a citizen of the United States, residing at the city and county of San Francisco and State of California, have invented certain new and useful Improvements in Apparatus for Manufacturing Vehicle Bumper - Bars, of which the following is a specification.

The present invention relates to an apparatus for working metal, particularly heated strap metal to form or fashion therefrom a shape adapted to be used as a bumper or guard for attachment to vehicles, and more particularly to an article commonly known as an automobile bumper.

Machines for this purpose, as heretofore constructed, have not employed a forming die, the parts of which are adapted for interchangeability in fashioning or forming the opposite ends of the bumper, and the present invention has for one of its principal objects to provide such a construction. In the machines heretofore used, and wherein an eye or loop has been formed at the extremity of the impact face of the bumper, the metal has been clamped between two die forming members in the formation of the loop, which action has rendered the material about the loop subject to breakage, and to obviate this defect one of the principal objects of the present invention is to draw or roll the material about a stationary member in the formation of this loop end, which insures a symmetrical bend or curvature, and during the formation of the loop a uniform pressure is exerted on all portions of the material forming said loop. A further object is to provide an apparatus whereby bumpers for attachment to vehicles of different frame widths and treads may be formed on the same machine by slightly varying the position of one of the parts of the apparatus. A further object is to provide the forming member of the die with a removable head, whereby heads of different lengths may be employed in connection with a single forming member, when it is desired to vary the distance between the attaching portion of the bumper and the looped end thereof, which terminates substantially in line with the tread of the vehicle.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 4 is a longitudinal sectional view taken on line 4—4 of Fig. 1, disclosing the members for holding the forming member in the position indicated in Fig. 3, should further work be desired on the supporting portions of the bumper bar.

Fig. 5 is a sectional view taken on line 5—5 of Fig. 1, viewed in the direction of the arrows.

Fig. 6 is a transverse sectional view taken on line 6—6, Fig. 1, viewed in the direction of the arrows.

Fig. 7 is a detail sectional view taken on line 7—7, Fig. 1, disclosing the means for retaining the lateral forming block in its adjusted position on the table.

Fig. 8 is a view in plan of the apparatus, illustrating in dotted lines the interchangeability of the various elements when it is desired to form both ends of the bumper without removing the material from the table.

Figure 1:
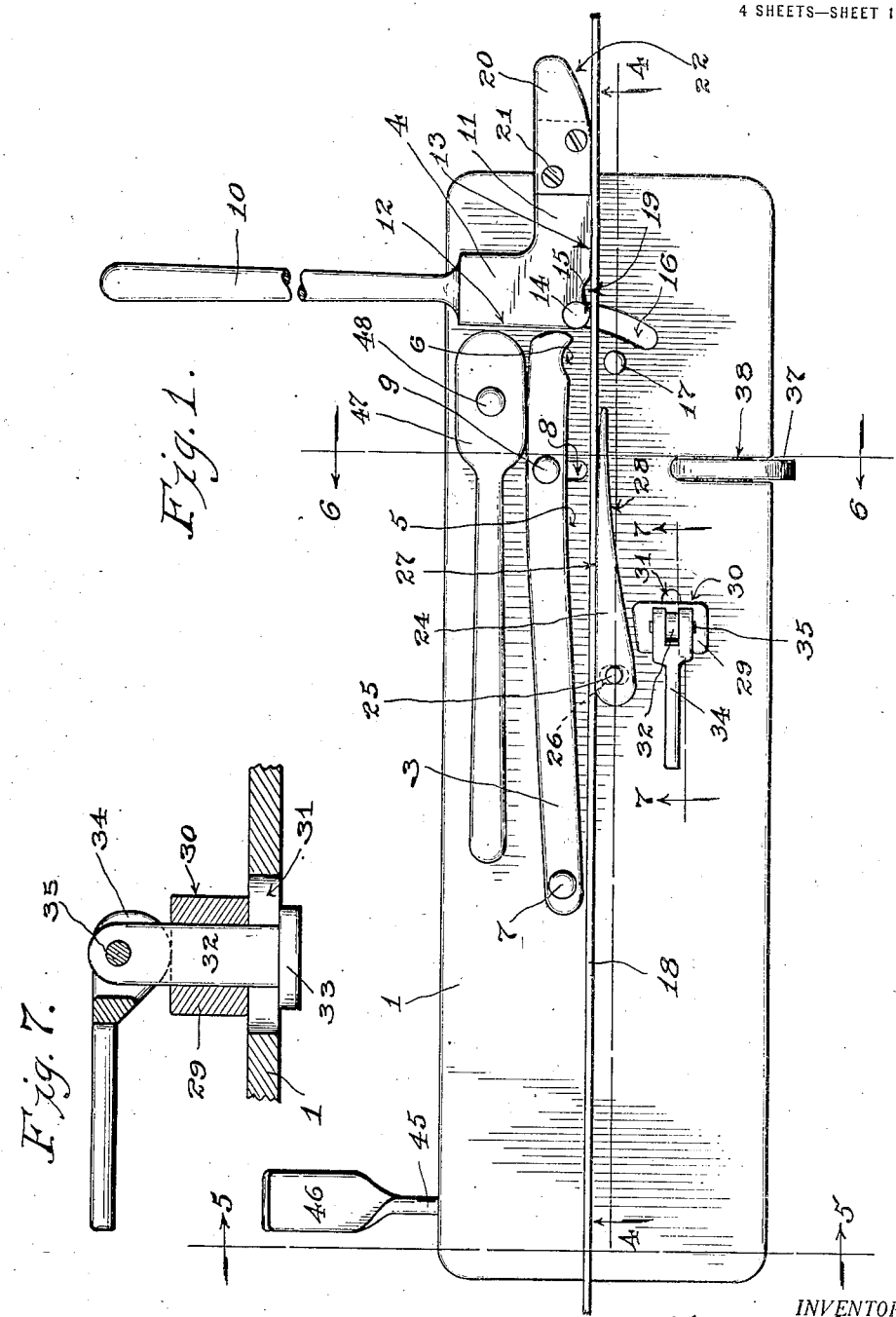
Figure 1 is a view in plan of the preferred embodiment of my invention, disclosing an apparatus for forming a bumper, the terminal or attaching ends of which are adapted to lie at substantially right angles from the impact face of the bumper bar.

In the drawings, wherein like characters of reference designate corresponding parts— the numeral 1 indicates a suitable flat table or bed, preferably of metal, and the same is supported, preferably at opposite ends, by the vertical legs 2. Mounted on the upper surface of the bed or table 1, is a suitable forming die consisting of an elongated holding member 3 and a forming member 4. The holding member, which is provided with a curved face 5, and which is formed at the outer end of said curved face with a semi-circular depression 6, is disposed to lie longitudinally of the approximate center of the table 1, and is fulcrumed at its inner end to the table 1 by a bolt or pin 7. The outer end of said member 3 is capable of movement over the surface of the table within the confines of the length of a suitable slot 8, arranged at right angles to said member 3, and within which projects a pin or bolt 9 passing through the member 3, and into said slot.

The forming member 4 is provided with a handle 10, laterally from which, preferably at right angles thereto, extends a leg 11, and said forming member 4 is adapted to rest on the upper surface of the table or bed 1. The member 4 is movable in a fixed path relative to the free end of the holding member 3 of the die, and carries at the point of connection of its rectangularly disposed outer faces 12 and 13, a suitable fulcrum point or bolt 14, which has an enlarged undersurface 15, and projects through and is freely slidable in an arcuate slot 16, formed in the surface of the table 1, adjacent the free end of the holding member 3 of the die.

Removably positioned and extending upwardly from the upper surface of the bed or table 1, and located in line with the semicircular depression 6 in the free end of the member 3, is an eye forming stud or member 17. The member 17 is positioned adjacent the inner surface of the arcuate slot 16 near the lower end thereof, as in Fig. 1 of the drawings, and provides a means about which the bumper forming material 18 is rolled in providing an eye at the looped ends of the bumper during the formation thereof. The surface 13 of the forming member of the die is provided adjacent the bolt 14 with a semi-circular depression 19, corresponding to the depression 6 in the member 3; said depression 19 during the operation of the forming member rolls the rear surface of the bumper forming material 18 about the stud 17, and when said forming member is at its completion of operative movement, said depression, together with the face 13, forms the inner surface of the loop at the end of the bumper.

To the end of the leg 11 of the forming member 4 is detachably secured a suitable tip or head 20, which is detachably secured to the leg 11 by any suitable means, such as screws or bolts 21, and the working face of said head is gradually curved, as at 22, providing a means for forming a curve or bend joint between the attaching portion 23 of the bumper and the rear inner end of the loop.

To provide a space between the front and rear portions of the material forming the loop end of the bumper, I prefer to employ a floating spacer member 24, preferably of a length considerably shorter than the member 3 of the die, and disposed longitudinally of the center of the table 1 in coöperative relation with the inner curved surface 5 of the die member 3. The free end of the floating spacer 24 is preferably pointed, and at its opposite end said spacer is provided with the laterally extending fulcrum lugs 25, one of which is adapted for reception within an elongated slot 26 formed in the table surface 1. One face of the member 24 is preferably curved, as at 27, to correspond with the curvature of the face 5 of the member 3, and the opposite face 28 of said floating spacer is curved preferably a greater degree than the face 27, and forms the contour of the inner portion of the bumper loop. The terminal or pointed end of the spacer member 24 terminates in line with and a short distance from the stud 17, as in the drawings, enabling the bending of the bumper forming member 18 almost completely around the stud 17, as in Figs. 3 and 8 of the drawings, before the material forming the remaining portion of the loop begins its rearward curve to form the attaching portion 23.

To provide the lateral attaching portion 23 rearwardly disposed from the impact face of the bumper and forming a continuation of the looped end thereof, I prefer to employ, in connection with the die members 3 and 4, an adjustable forming block 29 having a flat face 30 disposed preferably transversely of the upper surface of the table 1 at a point in rear of the curved face 28 of the floating spacer member 24. The block is adapted to rest on the upper face of the table 1 and is adjustable longitudinally thereof within the length of a longitudinal slot 31 formed in the surface of the table 1, and said block is adapted to be held in its adjusted position by any suitable mechanism, the form illustrated comprising a headed bolt 32 carried by the block and the head 33 thereof passing through the slot 31 and adapted for drawing into tight frictional contact with the under-surface of the table by the operation of a cam lever 34 pivoted as at 35 to the upper projecting end of the bolt 32, and said cam surface adapted for forcing into contact with the upper surface of the block 29 to clamp the same tightly onto the upper surface of the table 1, as in Fig. 7 of the drawings.

Figure 2:
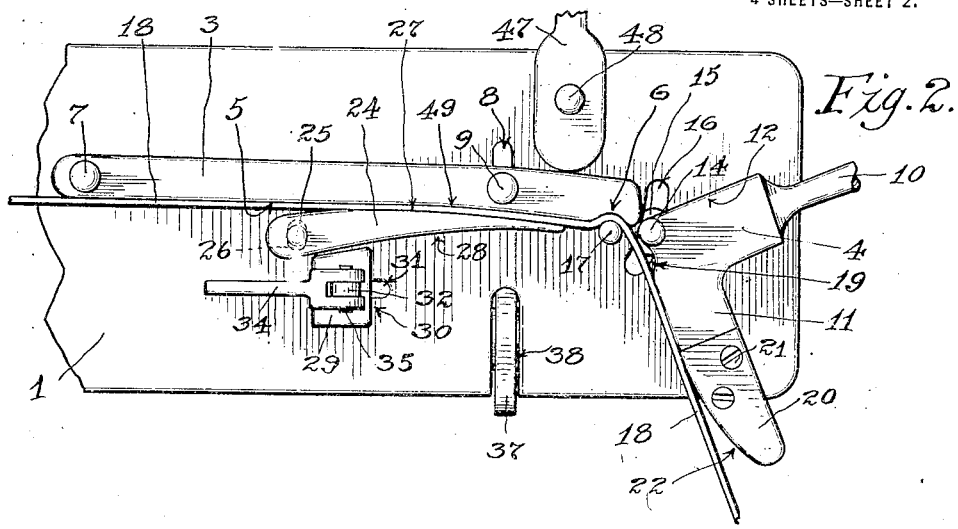
Fig. 2 is a view in plan of the apparatus in use, illustrating the forming die holding member clamped to the bumper forming material, and the forming member of the die operated to partly form the eye in the looped end of the bumper.
Figure 3:
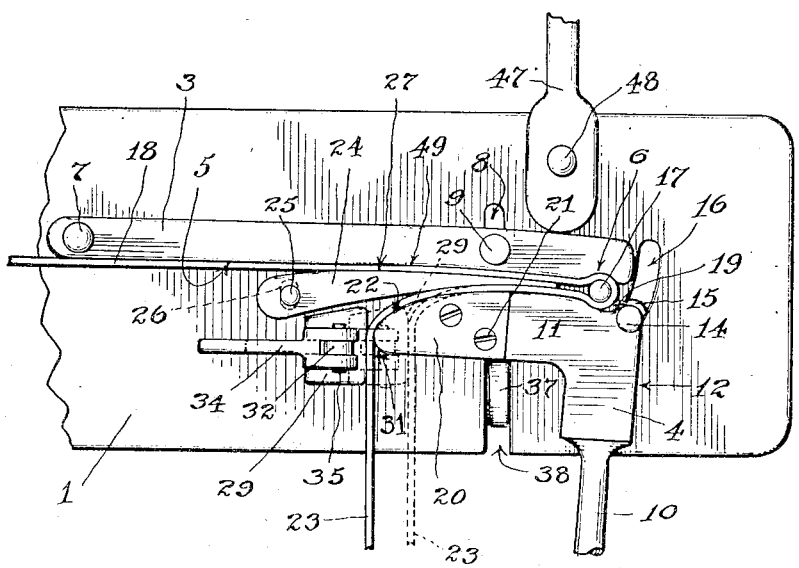
Fig. 3 is a view similar to Fig. 2 illustrating the forming member at the completion of its stroke, and illustrating in dotted lines the adjustment of the forming block when a head of short length is employed.

During the continued movement of the forming member 4 from its position in Fig. 2 to the completion of its movement, illustrated in Figs. 3 and 8, the material 18 forming the rear face of the loop, is forced against the face 28 of the floating spacer, and a portion thereof contacts with the face 30 of the block 29, which causes a drawing action of the material over the head 22, as illustrated in Figs. 3 and 8 of the drawings, giving a symmetrical contour or bend to the inner portion of the material forming the rear face of the bumper end loop and enables the terminal portion or attaching portion 23 to extend between the rounded end of the head 20 and the face 30 of the block 29.

By providing the removable head 20 in connection with the leg 11 of the forming die member 4 and securing to said leg head members of various lengths, I am enabled by adjusting the position of the forming block 29 to form at opposite ends of the bumper loops of various lengths, that is am enabled to vary the distance between the attaching portion 23, extending substantially at a right angle from the rear of the impact portion of the bumper, and the terminal or eye at the extreme end of the bumper. This enables the apparatus to be adjusted, whereby bumpers for different makes of vehicles may be manufactured, as it will be readily understood that the frames of all vehicles are not of the same width, thus the distance between the supporting portions 23 at opposite ends of the bumper and the distance between the frame members and the wheel tread of various makes of machines also differ, which necessitates various lengths of loops.

In the majority of instances, the attaching portions 23 of the bumper extend parallel with and are secured to the outer faces of the vehicle frame in any suitable manner, but in some instances a twist is imparted to the terminal portion of the attaching member 23 to dispose that portion thereof slightly in rear of the block 29 in a horizontal plane, and during this operation, while the metal is hot, it is necessary to retain the forming member 4 in its closed position, as in Fig. 3 of the drawings, and in carrying out this retaining operation I prefer to use the following mechanism.

Fulcrumed as at 36, beneath the table 1, and engaging at its upper end the outer face of the leg 11 of the forming member 4, is an arm 37, the upper end of which operates through a slot 38 in the table edge, and the lower end of said arm is pivotally connected through a link 39 with an arm 40 keyed to rotate with the shaft 41 extending longitudinally of the underface of the bed or table 1 and supported by bearing brackets 42. The opposite end of said shaft carries an arm 43 corresponding to arm 40, which is in turn connected through a link 44 with a pivotally mounted pedal 45 having a tread surface 46. The depressing of the pedal 45 throws the link 44 associated therewith substantially in alinement with the arm 43 and raises the free end of the arm 37, forcing the same in tight contact with the outer face of the leg 11, as in Figs. 3 and 8 of the drawings. This operation of the member 37 retains the forming member 4 in a position to retain the bumper forming material in its bent position, forming a looped end having an eye in its extremity, and in use the parts are permitted to remain in the position indicated in Figs. 3 and 8, until the metal cools sufficiently to insure its bended form.

I provide a holding member clamp 47 pivotally mounted, as at 48, to the upper surface of the table 1, adjacent the free end of the forming die holding member 3, and the movement of said lever 47 from its position in Fig. 1 to its position in Figs. 2, 3 and 8, tightly clamps the material 18 between the stud 17 and the curved face 5 of the forming die holding member 3, partially forming the eye in the extremity of the looped end.

In forming a bumper wherein the terminal attaching portions 23 lie in a plane at right angles to the impact face of the bumper, and are not curved or twisted, I employ the apparatus illustrated in Fig. 1, and operate the same in the following manner.

The various parts of the apparatus lying in what may be termed open position, as in Figs. 1 and 6 of the drawings, I position a flat bar of metal, brought to an extremely high temperature, longitudinally of the table 1 and dispose the same edgewise. I then operate the lever or clamp 47 on its pivot 48 moving the same to the position indicated in Fig. 2, which forces the forming die holding member 3 into contact with the outer face of the material 18, making a slight bend 49 in the material corresponding to the contour of the face 5 of the member 3 and the surface 27 of the member 24, and also causing the semi-circular depression 6 in the extreme end of the member 3 to force the material 18 partially around the stud 17, as in Fig. 2 of the drawings. I then grasp the handle 10 of the forming member 4 and gradually swing the same on its fulcrum 14, which movement rolls the material 18 around the stud 17, and as the face 13 of the leg 11 of the forming member slides on the outer surface of the material 18 during this operation, the fulcrum point of the forming member 4, relative to the table 1, changes or moves longitudinally of the arcuate slot 16, as in Fig. 2 of the drawings; this action insuring a tight bending of the material around the stud 17 during the formation of the eye in the extremity of the loop. The movement of the forming member 4 is continued from the position in Fig. 2 to that illustrated in Figs. 3 and 8, which causes the formation of the rear portion of the loop, the depression 19 in the face 13 of the leg 11 forming the rear portion of the eye about the stud 17, and this continued movement of the forming member causes the free end of the material 18 to contact with the face 30 of the block 29, which with the bending of the material about the face 22 of the head 20, provides the rearward bend or curve in the loop end of the bumper bar. To permit this bend to set, I then depress the pedal 45, throwing the upper end of the lever 37 in contact with the outer face of the leg 11 of the forming member 4. To form the loop at the other end of the bumper, the parts are thrown to open position, as in Fig. 1; the material 18 is reversed on the table 1 and the free unbent end thereof is positioned as in Fig. 1 with the loop or formed end resting on the opposite end of the table, after which time the bending operation above described is again carried out.

As illustrated in Fig. 8, when bumper bars are formed having twisted supporting portions, the table 1 is elongated over that form illustrated in Fig. 1, and two levers 37 are provided at opposite ends of the table, that is the lever illustrated in Fig. 1, with its associated parts, is duplicated.

In this construction, two blocks 29 and their associated parts are provided, and in the forming of the bumper bar the holding member clamp 47, forming die holding member 3, forming member 4, floating spacer 24 and stud 17 are reversed, and are positioned as illustrated in dotted lines in Fig. 8; thus the one set of implements in their reverse position are utilized to form both looped ends of the bumper bar without removing or changing the position of the bumper bar on the table 1.

It will be apparent that from the herein description and operation that the present invention is particularly designed for forming vehicle bumper bars of the type illustrated and set forth in Letters Patent of the United States No. 1191306, granted to T. A. Hoover, July 18, 1916, and that type illustrated in Letters Patent No. 1202690 granted R. B. Fageol, October 24, 1916.

Having thus described my invention, what I claim as new and desire to protect by Letters Patent is:—

1. A bumper forming apparatus comprising a table, a forming die mounted thereon and consisting of a holding member and a coöperating forming member independent of said holding member, a stud carried by said table and between which and the holding die the bumper forming material is positioned, means for forcing said holding die member toward said stud to clamp the material therebetween, said forming member having a pivotal movement on a floating fulcrum movable in an eccentric arc about said stud to form an eye in said bumper forming material and to bend the end portion of the material back upon the body portion to form a loop in the end of the bumper on the closing of the die members.

2. A bumper forming apparatus comprising a table, a forming die mounted thereon and consisting of a holding member and a coöperating forming member independent of said holding member, said forming member consisting of an angular body, a handle secured to one leg of said body, the other leg of said body provided with an operating face, a stud carried by said table and between which and the holding die the bumper forming material is positioned, means for forcing said holding die member toward said stud to clamp the material therebetween, said table provided with an arcuate slot, said forming member at the junction of its faces provided with a pin having coöperative engagement with said slot, said slot and pin providing a floating fulcrum about said stud for said forming member, whereby on the pivotal movement of said forming member to closed position of the die an eye is formed in said bumper forming material about said stud and the end portion of the material is bent back upon the body portion to form a loop in the end of the bumper.

3. A bumper forming apparatus comprising a table, a forming die mounted thereon and consisting of a holding member pivotally mounted at one end and a coöperating forming member having angularly disposed faces positioned adjacent the free end of said holding member and independent thereof, a handle extended from one of the faces of said forming member, a stud projecting above the table and between which and the face of said holding die the bumper forming material is positioned, means for clamping the material between the free end of said holding die and said stud, said forming member provided between its faces with a pin adapted for pivotal movement in a floating fulcrum relative to the free end of the holding member and the said stud, whereby pivotal movement of said forming member on said fulcrum will draw said bumper forming material about said stud to form an eye therein and bend the end portion of the material back upon the body portion to provide a loop end for the bumper, a forming block for coöperation with the free end of said forming member and provide an abutment against which the end portion of the loop forming material abuts on the movement of the forming die member to close position to provide a lateral extending portion at the terminus of the loop forming portion of the bumper forming material.

4. A bumper forming apparatus, comprising a table, a forming die mounted thereon and consisting of a holding member and a coöperating forming member independent of said holding member, a stud carried by said table adjacent one end of the holding member and between which and the holding member of the forming die the bumper forming material is positioned, means for clamping the material between said holding member and stud, and a floating fulcrum for said forming die adjacent one end of said holding member and said stud, whereby said forming member is capable of pivotal movement on said table on a variable fulcrum movable in an eccentric arc about said stud to form an eye in said bumper forming material and to bend the end portion of the material back upon the body portion on the closing of said die forming member.

5. A bumper forming apparatus comprising a table, a forming die mounted thereon and consisting of a holding member and a coöperating forming member independent of said holding member, a fulcrum for said forming member, said forming member comprising an operating leg and a handle extended angularly therefrom, providing a free end therefor, a tip detachably secured to the free end of said operating leg, a spacing member associated with the holding die member and between one face of which and one face of the holding die member the bumper forming material is positioned and about which the material is bent during the movement of the forming die member to closed position, and a forming block associated with and adjustable longitudinally of said table for coöperation with the detachable tip of said forming die member and providing an abutment against which the end portion of the bumper forming material abuts on the movement of the forming die member to closed position to provide a laterally extending portion at the terminus of the bumper forming material.

6. An apparatus for forming a loop in bumpers, comprising a table, a forming die mounted thereon and consisting of a holding member and a forming member mounted for pivotal movement about the holding member, said forming member comprising an operating leg and a handle extended angularly therefrom providing a free end for said leg, a spacing member carried by the table and adapted for lying between the coöperating faces of the die forming members when the same are in their closed position and about which the bumper material forming the loop is bent, a forming block carried by the table and providing an abutment against which the end portion of the bumper forming material abuts on the movement of the forming die member to closed position to bend the bumper forming material to provide a laterally extending portion at the terminus of the bumper loop, and means for varying the point of bend of said material to vary the distance between the laterally extending portion and the outer end of the loop.

7. An apparatus for forming a loop in bumpers, comprising a table, a forming die mounted thereon and consisting of a holding member and a forming member mounted for pivotal movement about the holding member, said forming member comprising an operating leg and a handle extended angularly therefrom providing a free unobstructed end for said leg, a spacing member carried by the table and adapted for lying between the coöperating faces of the die forming members when the same are in their closed position and about which the bumper material forming the loop is bent, a forming block on said table and capable of adjustment to and from the fulcrum point of said forming member and providing an abutment against which the end portion of the loop forming material abuts on the movement of the forming member to closed position, and a removable tip associated with the free end of the operating leg of said forming member.

8. A bumper forming apparatus comprising a table, a forming die thereon consisting of a holding member and a coöperating forming member independent of said holding member, a stud carried by said table and between which and the forming die the bumper forming material is positioned, means for clamping the material between the forming die and said stud, said table provided adjacent said stud with an arcuate slot, a fulcrum pin carried by said forming die and receivable within said slot, said slot and fulcrum pin providing a pivotal mounting for said forming die and a floating fulcrum about said stud, whereby an eye is formed in said bumper forming material on the closing of the die members as the end portion of the material is bent backward on the body portion.

9. A bumper forming apparatus comprising a table, a forming die mounted thereon and consisting of a holding member capable of limited free movement on the table and a coöperating forming member independent of said holding member and positioned adjacent one end thereof, a stud carried by the table adjacent said holding and forming members and between which and the forming die the bumper forming material is positioned, means for clamping the material between said die and holding member, a floating spacer member positioned adjacent said holding member with one face in substantial alinement with the operating face of said holding member and having a tapered end terminating adjacent said forming member, said table provided adjacent said stud with an arcuate slot, a fulcrum pin projected from said forming member and extending into said slot whereby a floating fulcrum is provided for said forming member, enabling the pivotal movement of said forming member about said stud to closed position toward the face of said spacer member to form an eye in said bumper forming material and to bend the end portion of the material back on the body portion and in contact with one face of said spacer member.

10. A bumper forming apparatus comprising a table, a forming die mounted thereon and consisting of a holding member and a coöperating forming member independent of said holding member, a stud fixed to said table and between which and the holding die the bumper forming material is positioned, means for clamping the material between the holding member and said stud, said forming member having a pivotal movement on a floating fulcrum about said stud and said holding member to form an eye in said bumper forming material and to bend the end portion of the material back upon the body portion to form a loop in the end of the bumper on the closing of the die members, and a foot operated lever capable of movement into engagement with said forming member to retain the same in its closed position.

11. A bumper forming apparatus comprising a table, a forming die mounted thereon and consisting of a holding member and a coöperating forming member independent of said holding member, a stud fixed to said table and between which and the holding die the bumper forming material is positioned, means for clamping the material between the holding member and said stud, said forming member having a pivotal movement on a floating fulcrum about said stud and said holding member to form an eye in said bumper forming material and to bend the end portion of the material back upon the body portion to form a loop in the end of the bumper on the closing of the die members, and a foot operated lever fulcrumed to said table and adapted at one end to project upwardly through said table, said lever capable of movement into engagement with said forming die member to retain the same in its closed position.

12. An apparatus for providing a straight bar with an end portion bent back on the body portion to provide a loop and with the terminal material projected laterally at right angles thereto, the same comprising a table, a die associated therewith and consisting of a holding member and a movable forming member independent of said holding member, said holding member consisting of an elongated member against one face of which the bar of material is positioned, a spacing member for contacting with the material as held against the holding member and about one end of which the material is looped on the movement of the forming member, a fulcrum for said forming member adjacent one end of said holding member, whereby pivotal movement of the forming member relative to said table is permitted and arcuate movement of said fulcrum relative to the end of said holding member is provided to loop the material about said forming member; and a block into contact with which the terminal end of the material is forced on the completion of the movement of said forming member in one direction on its fulcrum.

13. A bumper forming apparatus comprising a table, a forming die mounted thereon and consisting of a holding member and a coöperating forming member, a stud carried by the table and between which and the holding member a straight bar of material is positioned with its free end extending into the path of movement of said forming member, means for clamping the material in position between said members, said forming member having a free operating leg, said forming member having pivotal movement to closed position on a floating fulcrum about said stud to form an eye in said bar and to bend the end portion of the bar back upon the body portion to form a loop in the end of the bar on the swinging of the forming member to closed position, a removable tip associated with the free end of said leg, and a block associated with the table and over one face of which said tip passes on the movement of the forming member to closed position.

In testimony whereof I have signed my name to this specification in the presence of two subscribing witnesses.

EDWARD M. LITTLE.

Witnesses:
HARRY A. TOTTEN,
D. B. RICHARDS.